US011978323B2

(12) United States Patent
Pertgen

(10) Patent No.: US 11,978,323 B2
(45) **Date of Patent: *May 7, 2024**

(54) BLACKJACK AND WAGERING GAMING METHODS AND SYSTEMS

(71) Applicant: Michael Pertgen, Las Vegas, NV (US)

(72) Inventor: Michael Pertgen, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,841

(22) Filed: Nov. 7, 2023

(65) Prior Publication Data

US 2024/0071182 A1 Feb. 29, 2024

Related U.S. Application Data

(63) Continuation of application No. 17/741,416, filed on May 10, 2022, now Pat. No. 11,810,432, which is a continuation of application No. 17/094,349, filed on Nov. 10, 2020, now Pat. No. 11,328,561, which is a continuation of application No. 16/445,204, filed on Jun. 18, 2019, now Pat. No. 10,832,531.

(60) Provisional application No. 62/686,631, filed on Jun. 18, 2018.

(51) Int. Cl.

| | |
|---|---|
| ***G07F 17/32*** | (2006.01) |
| ***A63F 1/00*** | (2006.01) |
| ***A63F 1/02*** | (2006.01) |
| ***A63F 1/06*** | (2006.01) |
| ***A63F 3/00*** | (2006.01) |

(52) U.S. Cl.
CPC ............ *G07F 17/3293* (2013.01); *A63F 1/02* (2013.01); *G07F 17/3209* (2013.01); *G07F 17/3211* (2013.01); *G07F 17/3225* (2013.01); *A63F 2001/003* (2013.01); *A63F 1/067* (2013.01); *A63F 2003/00164* (2013.01)

(58) Field of Classification Search
CPC ............. G07F 17/3293; G07F 17/3209; G07F 17/3211; G07F 17/3225; A63F 1/02; A63F 1/067; A63F 2001/003; A63F 2003/00164
See application file for complete search history.

(56) References Cited

U.S. PATENT DOCUMENTS

2011/0086703 A1* 4/2011 Miller .................. A63F 13/332 463/31
2013/0005423 A1* 1/2013 Hall .................... G07F 17/3276 273/292
2016/0125702 A1* 5/2016 Mugnolo ............ G07F 17/3293 273/292
2018/0053381 A1* 2/2018 Morin ................ G07F 17/3293

* cited by examiner

*Primary Examiner* — Werner G Garner
(74) *Attorney, Agent, or Firm* — Newman Law, LLC

(57) ABSTRACT

Systems and methods of conducting wagering games involving, among other things, a modified Blackjack wagering game including an option to resolve the game prior to a final determination and optional wagers on the final dealer hand score.

20 Claims, 9 Drawing Sheets

BLACKJACK AND WAGERING GAMING METHODS AND SYSTEMS

CROSS-REFERENCE TO RELATED APPLICATIONS

This application is a continuation of U.S. Non-provisional application Ser. No. 17/741,416 filed May 10, 2022 and issued as U.S. Pat. No. 11,810,432, which is a continuation of U.S. Non-provisional application Ser. No. 17/094,349 filed Nov. 10, 2020 and issued as U.S. Pat. No. 11,328,561, which is a continuation of U.S. Non-provisional application Ser. No. 16/445,204 filed Jun. 18, 2019 and issued as U.S. Pat. No. 10,832,531, all of which claim the priority benefit of U.S. Provisional Patent Application No. 62/686,631 filed Jun. 18, 2018, the disclosures of which are incorporated herein by reference.

BACKGROUND OF THE INVENTION

Field of the Invention

The present invention relates to the field of gaming, particularly to the field of wagering games involving random gaming implements, such as cards, and more particularly to modified and unique wagering games.

Background of the Art

The invention relates to the field of casino table wagering games, particularly casino table card games related to the play of the game of Blackjack.

As gaming continues to enjoy widespread acceptance, casinos are increasingly in need of new games of chance to retain and attract patrons. While electronic gaming devices (e.g., slot machines) attract the most attention, many players prefer the skill requirements and personal interaction of live gaming. Thus, live gaming continues to be an integral component to the success of any casino. One of the most popular live games is Blackjack.

The objective of Blackjack is for a wagering player to finish a round of play with a hand of playing cards with a sum of the total value of cards coming as close as possible to the value of twenty-one, without the player hand total exceeding twenty-one. The game is played by one or more players against a dealer with the player making an initial wager on a final outcome under the rules of Blackjack, which remain fairly consistent throughout the world, and with only minor variations in different casinos or jurisdictions. Players' hands that are less than or equal to twenty-one and exceed the value of the dealer's hand win. All players' hands that have a lower sum than the dealer's hand and all hands that exceed the sum of twenty-one lose. Dealer and player hands with the same total value (without the player first busting) result in ties (called a "push"). An initial two-card hand totaling twenty-one points is called blackjack, and in the absence of the dealer having a similar hand automatically wins, without respect to the dealer's final hand count. A player blackjack is often paid at odds greater than 1:1.

One conventional method of playing Blackjack uses one or more standard decks of playing cards (a fifty-two card deck without Jokers). Each numbered card is counted according to its face value. The Jacks, Queens and Kings are worth ten (10), and Aces are worth either one (1) or eleven (11), depending on which is most beneficial to the count of the hand. A "Ten" card therefore hereinafter includes any card which has a value of ten in the game of Blackjack, that is, a numbered 10 card, Jacks, Queens and Kings.

Once all the bets are made, the dealer will deal the cards to the players. The dealer will make two passes around the table starting with the player farthest to the left so that the players and the dealer have one card after the first pass and then receive a second card each after the second pass. The two cards dealt to the dealer or house includes one card face up or otherwise exposed to view, usually the second (and last) card dealt.

A player views an initial value of cards in the player's hand, views the dealer's up card (the exposed card) and then makes decisions on drawing or not drawing further playing cards. This further drawing is done in an attempt to try and win the hand by having a higher count than the dealer's hand without busting or allowing the dealer to bust the house hand. The player can "stand" on any count of twenty-one or less. Once the player exceeds a count of twenty-one or "busts," the player wager is lost, whatever the ultimate point count of the dealer's hand. Usually, the dealer must hit with a point count of less than seventeen. Normally a dealer must stand on a soft count of at least seventeen, a soft count being a hand value where an Ace is counted as a value of eleven. House rules may vary, however.

Although the game of Blackjack is a consistent winning game for the house, players tend to place the minimum wager on a Blackjack game unless the player is using some system or feels that the cards are running in a favorable streak. A modified version of the game of Blackjack, which provides players interesting game play options and opportunities to win, thus increasing player participation and excitement, while also adding features that increase potential gaming revenue, would be attractive to both players and casino operators. Consequently, further variations of existing wagering games are always of interest to players and casinos, and therefore, there is a desire for methods which would increase wagering opportunities in the game of Blackjack.

SUMMARY OF THE INVENTION

Embodiments of the invention are generally directed to systems and methods of providing, hosting and playing a modified version of Blackjack in which a player, after placing a Blackjack wager, receives at least one card to form an initial game hand and has the option to discard a card from their respective initial game hand and replace the discarded card with at least one card forming the dealer's initial game hand.

Some embodiments of the invention are directed to a system and method of providing a modified Blackjack wagering game comprising: receiving a wager from one or more participating players; distributing playing cards to form an initial player hand for each participating player of the one or more participating players and an initial dealer hand, wherein the initial dealer hand includes a playing card in a condition revealing the rank of the playing card; responsive to the initial player hand score being within a range of preset hand scores, receiving a selection to resolve the round, wherein the round is terminated for the player and a payout is distributed to the player without a final resolution being determined for the Blackjack wagering game; and responsive to one of the initial player hand score being outside of the range of preset hand scores or receiving a selection to continue the round, operating the Blackjack game to a final resolution is determined, wherein the final resolution is determined based at least in part on a comparison of each final player hand score and the final dealer hand score.

In some embodiments, the wager received is a two part wager comprising a first part and a second part. In some embodiments, the systems and methods further comprises receiving a selection to surrender and end the round prior to a final resolution being determined, wherein the first part of the received wager is lost responsive to receiving the selection to surrender and the second part of the received wager is returned. In some embodiments, the payout distributed responsive to receiving the selection to resolve the round is a multiple of a first part of the received wager. The first part and second part of the received wager may be combined upon the final resolution being determined. The first part and the second part may be required to be equal.

In some embodiments, the systems and methods further comprise receiving a side wager identifying a final dealer hand score; receiving the final dealer hand score; distributing a payout responsive to the final dealer hand score matching the identified final dealer hand score, wherein the payout amount is based on the rank of the revealed playing card in the initial dealer hand.

Some embodiments of the invention are directed to systems and methods of providing a modified Blackjack wagering game over a communication network, comprising the steps of: providing a game server and a user interaction server; providing, by the user interaction server, a client for execution on a user device connected to the network and associated with a player, the user device being remote from the game server; the client receiving from the user device and communicating to the game server, an indication of a wager being entered by the player in connection with participation of a modified Blackjack game; the game server receiving consecutively in real-time, performing the following steps: receiving a wager from one or more participating players; distributing playing cards to form an initial player hand for each participating player of the one or more participating players and an initial dealer hand, wherein the initial dealer hand includes a playing card in a condition revealing the rank of the playing card; responsive to the initial player hand score being within a range of preset hand scores, receiving a selection to resolve the round, wherein the round is terminated for the player and a payout is distributed to the player without a final resolution being determined for the Blackjack wagering game; and responsive to one of the initial player hand score being outside of the range of preset hand scores or receiving a selection to continue the round, operating the Blackjack game to a final resolution is determined, wherein the final resolution is determined based at least in part on a comparison of each final player hand score and the final dealer hand score.

In some embodiments, the aforementioned systems and methods include providing virtual elements to the player associated with the user device, wherein the indication of a wager is provided by the player manipulating the virtual elements on the user device to a designated area associated with the wager.

Some embodiments of the invention are directed to a system of conducting a modified Blackjack game, the system comprising a display, a memory unit including executable code stored therein, and in communication with a processor, executing the executable code, being configured to: receiving a wager from one or more participating players; distributing playing cards to form an initial player hand for each participating player of the one or more participating players and an initial dealer hand, wherein the initial dealer hand includes a playing card in a condition revealing the rank of the playing card; responsive to the initial player hand score being within a range of preset hand scores, receiving a selection to resolve the round, wherein the round is terminated for the player and a payout is distributed to the player without a final resolution being determined for the Blackjack wagering game; and responsive to one of the initial player hand score being outside of the range of preset hand scores or receiving a selection to continue the round, operating the Blackjack game to a final resolution is determined, wherein the final resolution is determined based at least in part on a comparison of each final player hand score and the final dealer hand score.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF SOME EMBODIMENTS OF THE INVENTION

It should be understood that the invention is generally directed to systems, methods and apparatus for providing, operating, hosting and conducting interactive wagering games generally involving sequences of controlled and concrete transformative events or steps, the generation of random results or data, and the use and application of the randomly generated results in a manner which provides for the resolution of both prior and/or subsequent events or steps.

In the exemplary embodiments disclosed herein, the invention includes various steps such as those involving the receipt of wagers, provision of randomly generated gaming implements, distribution of the gaming implements according to preset formations and procedures, comparison of one or more of such formations with preset criteria, determining the outcome of wagers received and then settling the wagers depending on the determined outcome by one of any of the following actions: collecting the wagers, distributing an award payout, and returning the wager received.

It should be understood that the words "wager," "wagering," "betting" or "bet," or the like, refers to any type of points, money, credits, items of value, including physical or virtual representations thereof, which are placed at risk in that they may be forfeit depending on the occurrence and application of randomly generated data. Additionally, it should also be understood that gaming implements may include standard or customized playing cards, and may be provided in a physical form, such as a randomly-ordered group of shuffled cards, or in a virtual form, such as a display device operatively associated with a processing device, memory and random number generator for creating a depiction of a gaming implement on the display device and generating random results to simulate the random results of physical gaming implements, such as playing cards.

Each of the methods and individual steps recited herein may be partially or wholly carried out in a variety of ways and/or systems, which may include, but are not limited to: a live dealer physically dealing or using gaming implements in a casino; an electronic gaming machine (EGM) or kiosk for one or more players in which a live dealer distributes or uses gaming implements, such as dice, which may be in combination with a mechanism such as a camera or sensors for determining game outcomes by processing the random results with a data processor; or gaming implements provided through a program which may include a random number generator, standalone multiplayer platforms which may include a player interface such as a touchscreen display and physical or virtual gaming implements through a home computer or portable computing device, such as a tablet computer or mobile phone capable of communicating with a network or over the Internet, global telecommunication network or world wide web.

Figure 1A:
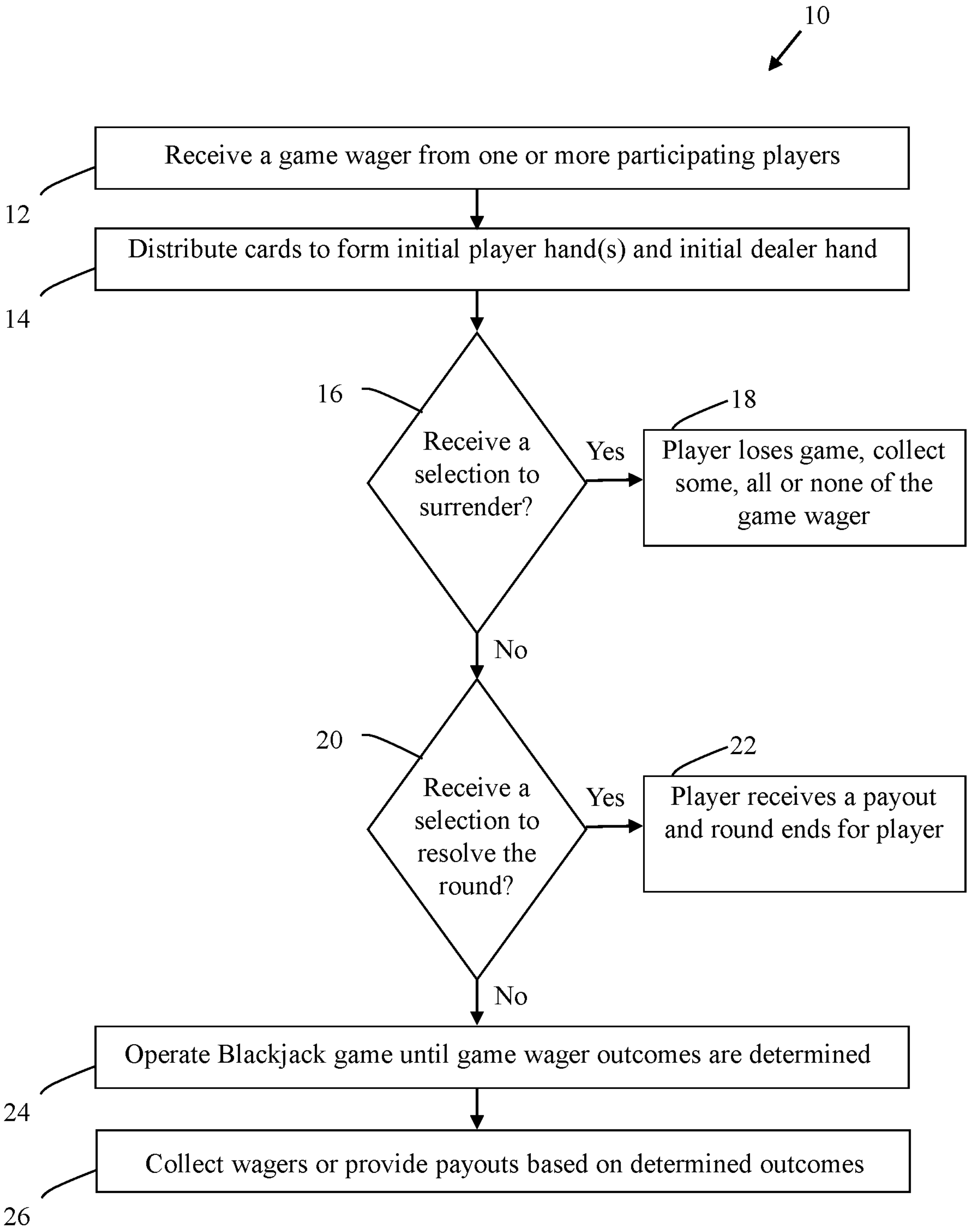
FIGS. 1A and 1B are process flow charts depicting exemplary gaming systems and configured and constructed according to various embodiments of the invention.

FIG. 1A provides an exemplary embodiment of the invention for providing a wagering game system and method generally referred to by the reference numeral 10. In this embodiment, gaming system and method 10 incorporates a kit of elements, which may include any or all of the following: one or more decks of randomly-ordered standard physical playing cards; lammers or other dealer buttons for tracking game play events or features; a display device; a dealer interface; memory; executable code stored in the memory; a processing device for facilitating the execution of the code stored in memory; and a customized gaming table surface or layout, which may take the form of the exemplary embodiment discussed further herein.

As shown in block 12, one or more game wagers are received by a player interested in participating in method 100. The one or more game wagers received in block 12 may comprise a singular wager or a multi-part wager, in which case the wagers may be in equal or unequal parts. Additional wagers may be received, such as, one or more side wagers, at this time or later during play of the game. In an exemplary embodiment, the game wager received in block 12 is a two-part wager, with each part being equal.

It should be understood that receiving a wager generally involves positioning of the physical representations of monetary amounts (e.g., tokens or chips) into a designated area on the surface of a physical gaming table. The gaming table surface may include various areas designated thereon for placing wagers for receipt thereof, including an associated wager area for the side wager and an underlying game wager area, designed areas for placing gaming implements, such as designated player positions for player wagers and gaming implements, and designated areas for the dealer and revealed gaming implements as discussed herein. In an exemplary embodiment of the invention, each part of a two-part wager is placed in separate adjacent areas on the gaming table surface.

As shown by block 14, gaming implements are used to generate initial player hands and an initial dealer hand. In this embodiment, playing cards from one or more randomly-ordered decks, or in other embodiments, randomly generated virtual representations of playing cards, are dealt to form the initial player hand and the initial dealer hand. An automated shuffling device may be operatively associated with a gaming table for facilitating provision of randomized cards pursuant to this block 14. The decks of cards may include all the standard cards or may be modified, such as by having certain cards added or removed from each deck. Modifications to the contents of the one or more decks may be made for a variety of reasons, such as to adjust the house advantage either in favor of the house or player.

The distribution of playing cards may follow a particular preset sequence and order. For example, according to the rules of conventional Blackjack, dealing cards involves a pattern in which each player receives a first card, beginning with the player to the left-most of the dealer and then proceeding to the right until all players have a first card. In an exemplary embodiment, the dealing procedure may be analogous to conventional Blackjack. In an alternative embodiment, players may be chosen randomly as the first player to receive the first card. In yet another alternative, dealing may start from a new player position after each round of the play, such as the adjacent player position as the starting player position from the dealing in the prior round. The cards are dealt to each player position around the table clockwise from the starting player position with the dealer receiving cards in order of the table. Card may be dealt face up, or otherwise in a manner which immediately reveals the card rank and suit, or face down, or otherwise without immediately revealing the card rank and suit. In an exemplary embodiment, the initial player hands are dealt with the cards face up while one of the cards in the initial dealer hand is dealt face up or revealed.

In the embodiment discussed herein, the distribution of playing cards involves the dealer position receiving one revealed (face up) card and one hidden (face down) card to form the initial dealer hand. In some embodiments, the initial dealer hand is checked to determine if the dealer hand is a natural Blackjack, that is, the initial dealer hand score being 21. In such embodiments, if the determination is made that the initial dealer hand is a natural Blackjack, the wager received in block 12 will be lost, unless the initial player hand is also a natural Blackjack.

In an exemplary embodiment, a two-part wager is received in block 12 and only one part is lost if the initial dealer hand is a natural Blackjack and the player's initial hand is not a natural Blackjack. If the initial dealer hand and the player's initial hand are both a natural Blackjack, then the two-part wager may push, that is, returned to the player. If the initial player hand is a natural Blackjack, then the player may receive an immediate payout, which may be a multiple of all or a part wager received in block 12.

If it is determined that the initial dealer hand is not a natural Blackjack, then the game of the invention may proceed, such as in the manner of any embodiments of the game as described herein. In some embodiments, players may place side wagers which pay responsive to the initial dealer hand being a natural Blackjack, in which case payouts will be provided if the initial dealer hand is a natural Blackjack, or the side wager will be collected should the initial dealer hand not be a natural Blackjack.

In this embodiment of the invention, a player may select to surrender. It is envisioned that a player may select to surrender based upon the consideration of their initial player hand, the face up card in the initial dealer's hand and their respective believed or statistical probability of winning against the dealer hand. If the surrender selection is received as shown in block 16, then all, some or none of the wager received as shown in block 12 may be lost and the player loses the round of the game as shown in block 18. In an exemplary embodiment, a two-part wager is received in block 12 and one part of the wager is lost in block 18 upon a selection to surrender being received from a player in block 16.

As shown by block 20, a player may select to resolve the round of the round of the game without further game play. In some embodiments, the option to resolve the game is only available responsive to the satisfaction of preset criterion. The preset criterion may relate to or include any conditions or characteristics associated with any or all of the cards in the initial player hand and/or the initial dealer hand, the wager received, the initial player hand score and/or initial dealer hand score, or face up card in the initial dealer hand. In some embodiments, the preset criterion is an initial player hand score within a certain range of possible hand scores. In an exemplary embodiment, the preset criterion is that the initial player hand score is equal to or greater than a hand score of 18 according to the conventional rules of Blackjack (which may exclude an initial player hand score of 21 if initial player hands of 21 have been paid already), and the wager received at block 102 may be resolved as a push or payouts may be distributed at 1:1 or greater.

As shown by block 22, if a selection to resolve the round of the game is received in block 20, then a payout is distributed and the round of the game ends for the player. In an exemplary embodiment, a two-part wager is received in block 12 and a payout equal to a multiple of one part of the two-part wager is distributed to a player in block 22 that selects to resolve the round in block 20.

As shown by block 24, if a selection to resolve the game is not received in block 20 or could not be received because a preset criterion was not satisfied, then the game is operated to determine the outcome of the game wager received in block 12. In some embodiments, operation of the game to determine the outcome involves playing the initial player hand and initial dealer hand generally according to conventional Blackjack rules, with or without modification. As shown by block 26, payouts are distributed and wagers are collected based on the outcomes determined in block 24. In an exemplary embodiment, a two-part wager received in block 12 would be combined into a single game wager for determination according to blocks 24 and 26.

Figure 1B:
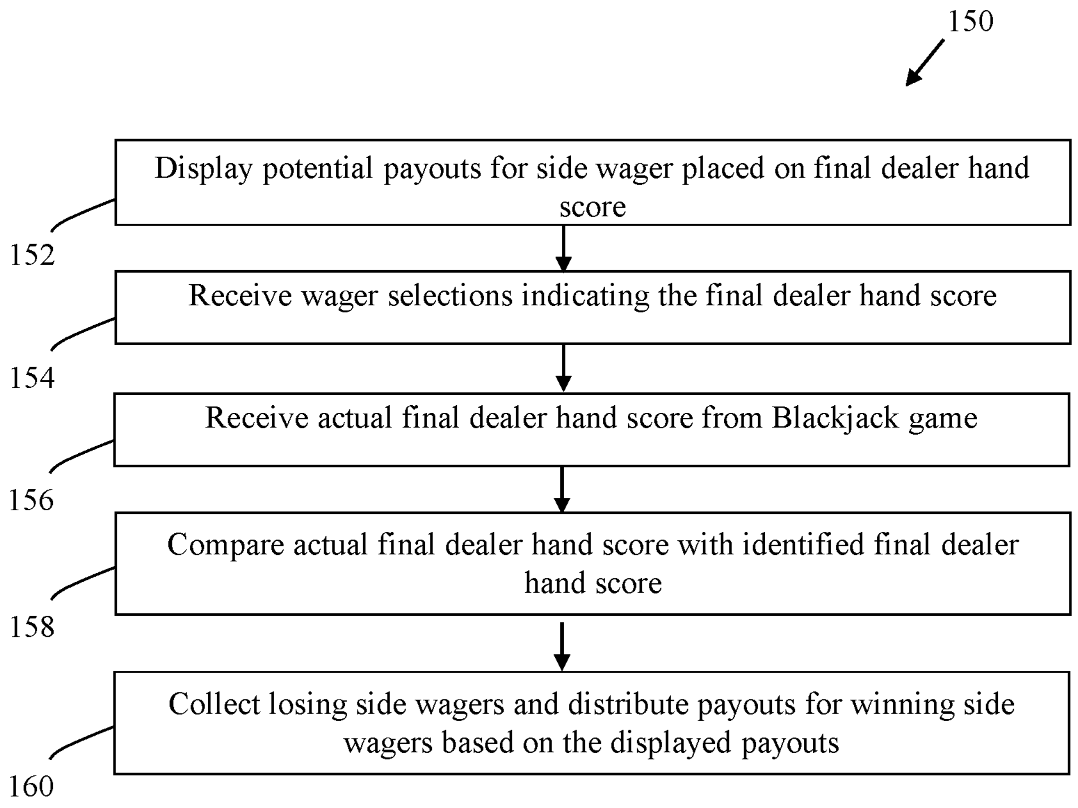

FIG. 1B illustrates an embodiment of a side wagering game system and method 150 which may be included as part of the wagering game system and method 150 or independently thereof, such as in connection with a conventional Blackjack game. In some embodiments, the side wagering game involves receiving a side wager having an outcome determined by the final dealer hand score, wherein the payout is based at least partially (or in some embodiments, solely) upon the face up card in the initial dealer hand. In some embodiments, a player must select one or more final hand scores per wager. In other embodiments, players place a wager which is determined to win upon the final dealer hand score being the same single number, a randomly selected number which may be randomly selected via a secondary random number generator (RNG), or a number within a preset range.

In the exemplary embodiment discussed herein, players must wager on a specific final hand score for the dealer hand. As shown by block 152, a display is provided indicating the potential payout of a side wager placed on the final dealer hand score based only upon the face up card in the dealer hand. For example, if the face up card in the dealer hand is a 10, then an odds payout that the dealer final hand score is 18 may be 6:1, or 6:5 that the final hand score is 20. Thus, it is envisioned that some players may select the higher payout but lower probability wager of final dealer hand score of 18, whereas other players may select the lower payout but higher probability wager of a final dealer hand score of 20, whereas other players may select both. The display may include the gaming table layout or a separate display which is operatively associated with a dealer interface, card reader, shuffler with a card reader or other device for determining the odds payout based on the dealer face up card. The display may include the odds payout for a group of potential final dealer hand scores, such as final dealer hand scores of 18, 19, 20 and 21.

An exemplary odds payout table for the side wagering system 150 is shown below

TABLE

Odds Payouts based on dealer face up card

| | Dealer score | | | |
|---|---|---|---|---|
| Dealer up-card | 18 | 19 | 20 | 21 |
| 10 | 7:1 | 7:1 | 3:2 | 25:1 |
| Ace | 4:1 | 4:1 | 4:1 | 11:1 |
| 2 | 6:1 | 6:1 | 6:1 | 7:1 |
| 3 | 6:1 | 6:1 | 7:1 | 7:1 |
| 4 | 6:1 | 7:1 | 7:1 | 7:1 |
| 5 | 7:1 | 7:1 | 7:1 | 8:1 |
| 6 | 8:1 | 8:1 | 8:1 | 9:1 |
| 7 | 6:1 | 11:1 | 11:1 | 12:1 |
| 8 | 3:2 | 6:1 | 12:1 | 12:1 |
| 9 | 7:1 | 3:2 | 7:1 | 15:1 |

In some embodiments, players may wager on one or more of a final dealer hand score of 18, 19, 20 or 21. As shown by block 154, wager selections are received from players indicating or identifying the dealer final hand score, which may be through placement of a wager on a designated area of table layout such as the layout shown in FIG. 2. In an exemplary embodiment, these side wagers may be received at any point prior to the revealing of the face down card in the initial dealer hand. For example, block 152 and thereafter may be inserted between blocks 20 and 24 of gaming system and method 10. As shown by block 156, the Blackjack game is operated, or data from a remote Blackjack game may be received, indicating the final results and in particular the final dealer hand score. As shown by block 158, the actual final dealer hand score is used to determine the outcome of the side wager by comparing the actual final dealer hand score with the final dealer hand score identified when the wager is received in block 154. As shown by block 160, the losing side wagers are collected and payouts are provided for any winning side wagers based on the odds displayed in block 152.

A progressive wagering game may also be included with any of the embodiments discussed herein. The progressive wagering game of the invention includes a processing device in communication with a display device at the gaming table and a random number generator for generating a random selection of a number, such as a number from the group of 17, 18, 19, 20 and 21. It should be understood that the group of numbers may vary. A bet sensor or actuator may be used to trigger the random selection of a number responsive to receipt of a progressive wager for the associated progressive wagering game. The randomly selected number is displayed on the display device and game play proceeds, thus providing enhanced stability, security and integrity, among other things, for the associated wagering game disclosed herein. Should the dealer's final hand score match the displayed number, or be within a certain group, then a payout will be awarded to any player from which the progressive wager is received. In some embodiments, the payout is increased by the same or different amounts responsive to each hit card distributed to the dealer hand during game play. For example, a final dealer hand of five cards which satisfies the criteria for winning the progressive wagering game will result in a higher percentage of the progressive jackpot being distributed to the winning players than a final dealer hand of less cards. The determined jackpot is distributed in equal shares to all players from which a progressive wager is received.

Various platforms are contemplated that are suitable for implementation of embodiments of wagering games according to this disclosure. For example, embodiments of wagering games may be implemented as live table games with an in-person dealer, electronic gaming machines, partially or fully automated table games, and fully automated, network-administered games (e.g., Internet games) that either produce game results utilizing a processor or produce a live video feed of a dealer administering a game from a remote studio.

As previously noted, any of the present methods and games may be played as a live casino game, as a hybrid casino game (with real or virtual cards), on a multi-player electronic platform, on a personal computer for practice, on a hand-held game for practice, on a legally-authorized site on the Internet, or on a play-for-fun site on the Internet, or through any other communication network.

For example, in one embodiment, the players may be remotely located from a live dealer, and a live dealer and a game table may be displayed to players on their monitors via a video feed. The players' video feeds may be transmitted to the dealer and may also be shared among the players at the table. In a sample embodiment, a central station may include a plurality of betting-type game devices and an electronic camera for each game device. A plurality of player stations, remotely located with respect to the central station, may each include a monitor, for displaying a selected game device at the central station, and input means, for selecting a game device and for placing a bet by a player at the player's station relating to an action involving an element of chance to occur at the selected game device.

Figure 2:
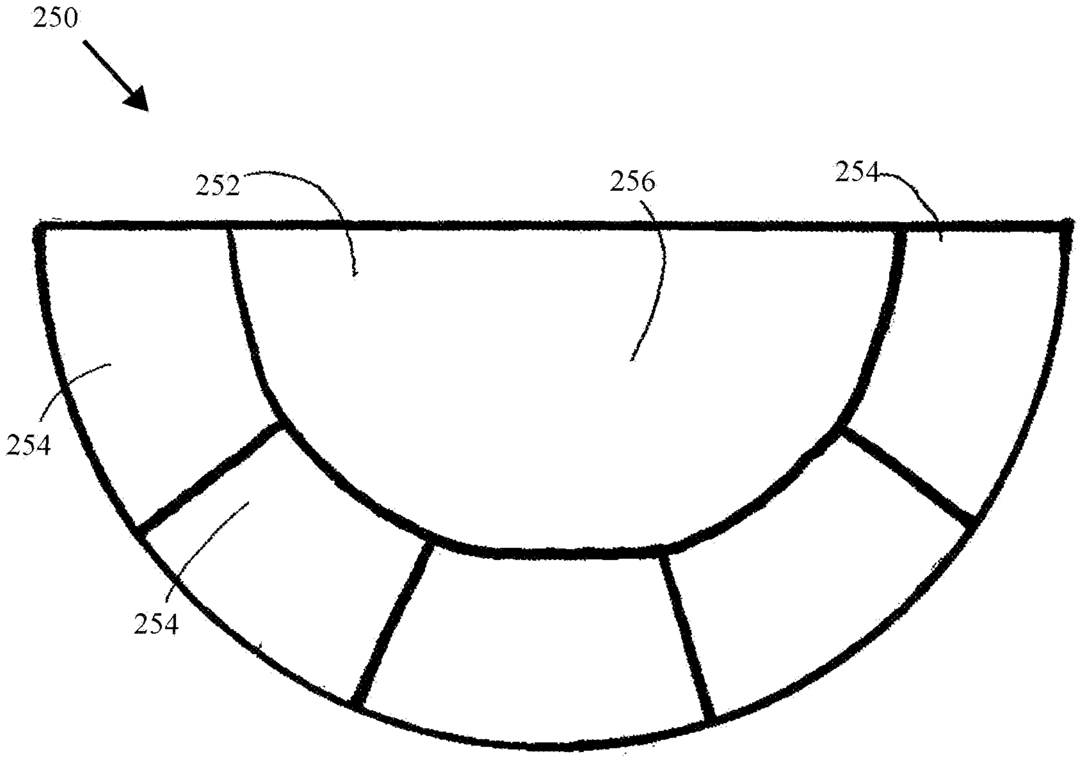
FIG. 2 is a diagram of a playing surface for implementation of a method of operating a wagering game, according to an embodiment of this disclosure.

FIG. 2 depicts exemplary elements for use in the implementation of the wagering games within the scope of the present disclosure referred to herein as gaming table surface or playing device layout 250. Layout 250 is provided in viewable form to the players and may include a surface area 252 and multiple player positions 254 (e.g., five player areas 254 are shown on surface 250) and a dealer position 256. Each player position 254 includes wagering areas for the standard wager and tie wager or other side wager. In operation of a round of the wagering game, wagers are received by physical implements or representations thereof being placed in their respective wager and/or area, with wager areas being left exposed if no respective wager is received. Cards may be distributed to each player position 254 and dealer position 256 to form the respective initial player hands and dealer hand, and then any additional hit cards thereafter, until the final hands are formed for the purpose of determining the outcome of wagers. The outcome of any wagers received in position 254 can be determined as described herein such as in connection with method 100.

Figure 3:
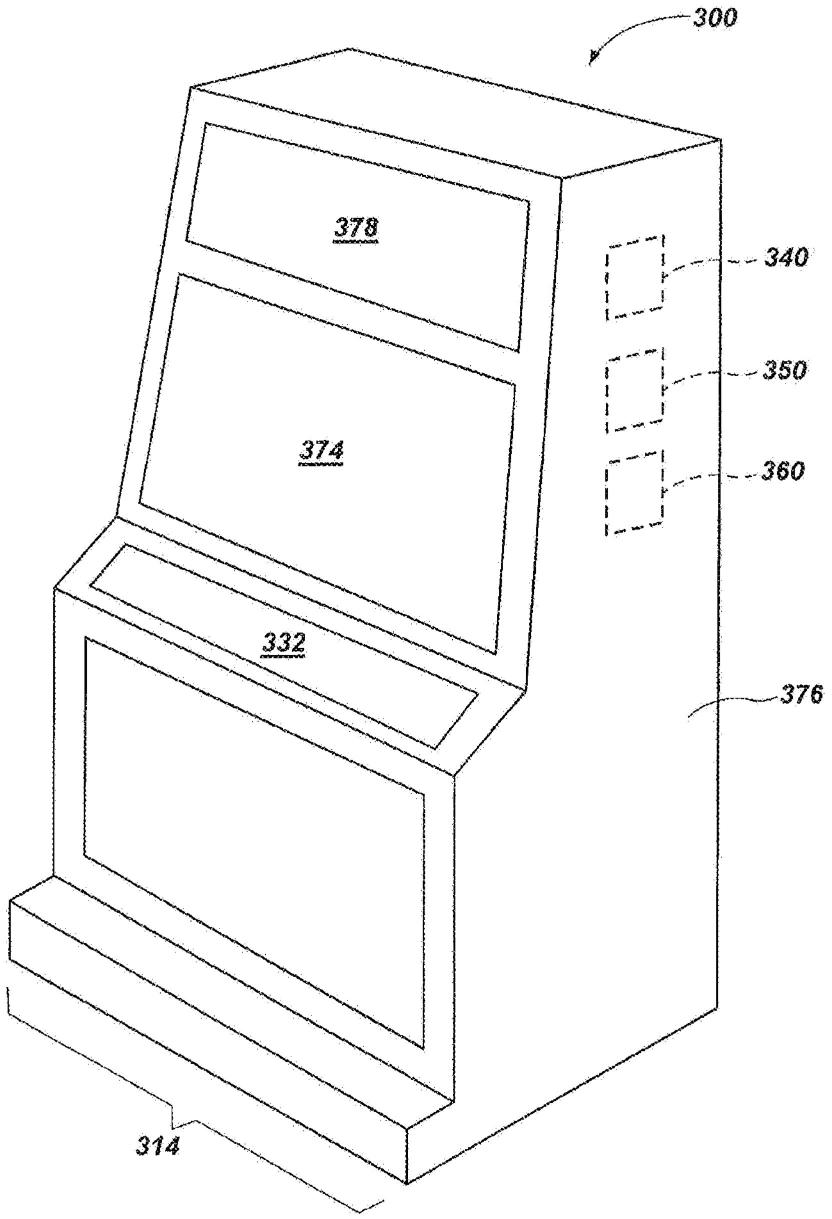
FIG. 3 is a perspective view of an individual electronic gaming device configured for implementation of embodiments of wagering games in accordance with this disclosure.

FIG. 3 is a perspective view of an individual electronic gaming device 300 (e.g., an electronic gaming machine (EGM)) configured for implementing wagering games according to this disclosure. The individual electronic gaming device 300 may include an individual player position 314 including a player input area 332 configured to enable a player to interact with the individual electronic gaming device 300 through various input devices (e.g., buttons, levers, touchscreens). The individual electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, chips, other wagering elements, or live personnel. The action may instead be simulated by a control processor 350 operably coupled to the memory 340 and interacting with and controlling the individual electronic gaming device 300.

Although the individual electronic gaming device 300 displayed in FIG. 3 has an outline of a traditional gaming cabinet, the individual electronic gaming device 300 may be implemented in other ways such as client software downloaded to a portable device, for example a smart phone, tablet, or laptop computer. The individual electronic gaming device 300 may also be a non-portable personal computer (e.g., a desktop or all-in-one computer) or other computing device. In some embodiments, client software is not downloaded but is native to the device or is otherwise delivered with the device when distributed.

A communication device 360 may be included and operably coupled to the processor 350 such that information related to operation of the individual electronic gaming device 300, information related to the game play, or combinations thereof may be communicated between the individual electronic gaming device 300 and other devices such as a server through a suitable communication medium, such as for example wired networks, Wi-Fi networks, and cellular communication networks.

The gaming screen 374 may be carried by a generally vertically extending cabinet 376 of the individual electronic gaming device 300. The individual electronic gaming device 300 may further include banners to communicate rules of game play and the like, such as along a top portion 378 of the cabinet 376 of the individual electronic gaming device 300. The individual electronic gaming device 300 may further include additional decorative lights (not shown), and speakers (not shown) for transmitting and optionally receiving sounds during game play.

Some embodiments may be implemented at locations including a plurality of player stations. Such player stations may include an electronic display screen for display of game information according to the invention (e.g., cards, wagers, and game instructions) and for accepting wagers and facilitating credit balance adjustments. Such player stations may optionally be integrated in a table format, may be distributed throughout a casino or other gaming site, or may include both grouped and distributed player stations.

Figure 4:
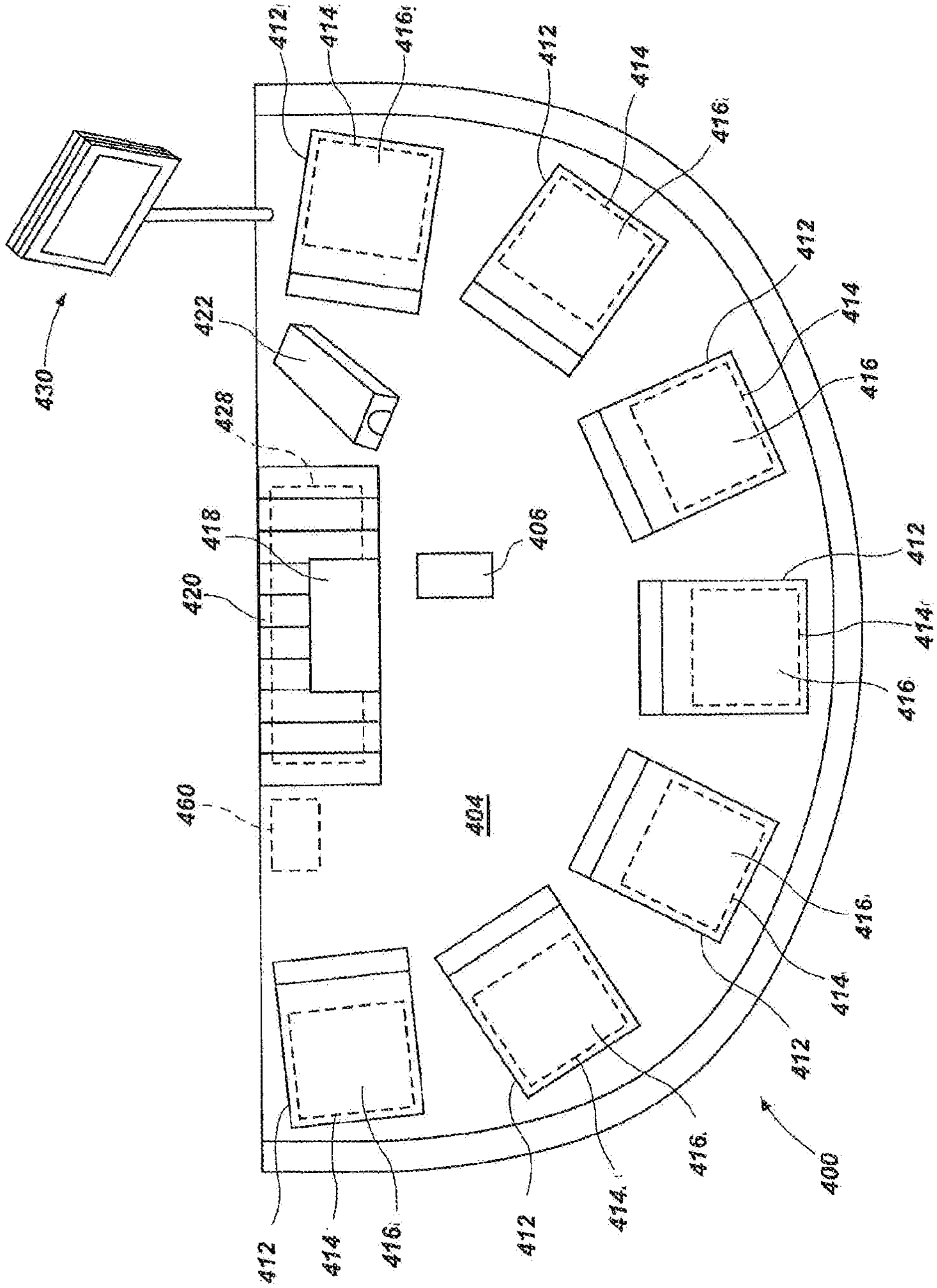
FIG. 4 is a top view of a table configured for implementation of embodiments of wagering games in accordance with this disclosure.

FIG. 4 is a top view of a suitable table 400 configured for implementing wagering games according to this disclosure. The table 400 may include a playing surface 404. The table 400 may include player stations 412. Each player station 412 may include a player interface 416, which may be used for displaying game information (e.g., game instructions, input options, wager information, game outcomes, etc. and accepting player elections). The player interface 416 may be a display screen in the form of a touch screen, which may be at least substantially flush with the playing surface 404 in some embodiments. Each player interface 416 may be operated by its own local game processor 414 (shown in dashed lines), although in some embodiments a central game processor 428 (shown in dashed lines) may be employed and may communicate directly with player interfaces 416. In some embodiments, a combination of individual local game processors 414 and the central game processor 428 may be employed.

A communication device 460 may be included and may be operably coupled to one or more of the local game processors 414, the central game processor 428, or combinations thereof such that information related to operation of the table 400, information related to the game play, or combinations thereof may be communicated between the table 400 and other devices through a suitable communication medium such as for example wired networks, Wi-Fi networks, or cellular communication networks.

Table 400 may further include additional features, such as a dealer chip tray 420, which may be used by the dealer to cash players in and out of the wagering game, whereas wagers and balance adjustments during game play may be performed using, for example, virtual chips (e.g., images or text representing wagers). For embodiments using physical cards, the table 400 may further include a card-handling device 422 (which may be configured to shuffle, read, and deliver physical cards for the dealer and players to use during game play or, alternatively, a card shoe configured to read and deliver cards that have already been randomized) and a designated area for physical cards 406, which may include multiple locations for the dealer hand and community cards as shown in game table surface 250 (see FIG. 2). For embodiments using virtual cards, the virtual cards may be displayed at the individual player interfaces 416.

The table 400 may further include a dealer interface 418 which, like the player interfaces 416, may include touch screen controls for receiving dealer inputs and for assisting the dealer in administering the wagering game. The table 400 may further include an upright display 430 configured to display images that depict game information such as pay tables, hand counts, historical win/loss information by player, and a wide variety of other information considered useful to the players.

Although an embodiment is described showing individual discrete player stations, in some embodiments, the entire playing surface 404 may be an electronic display that is logically partitioned to permit game play from a plurality of players for receiving inputs from and displaying game information to the players, the dealer, or both.

Figure 5:
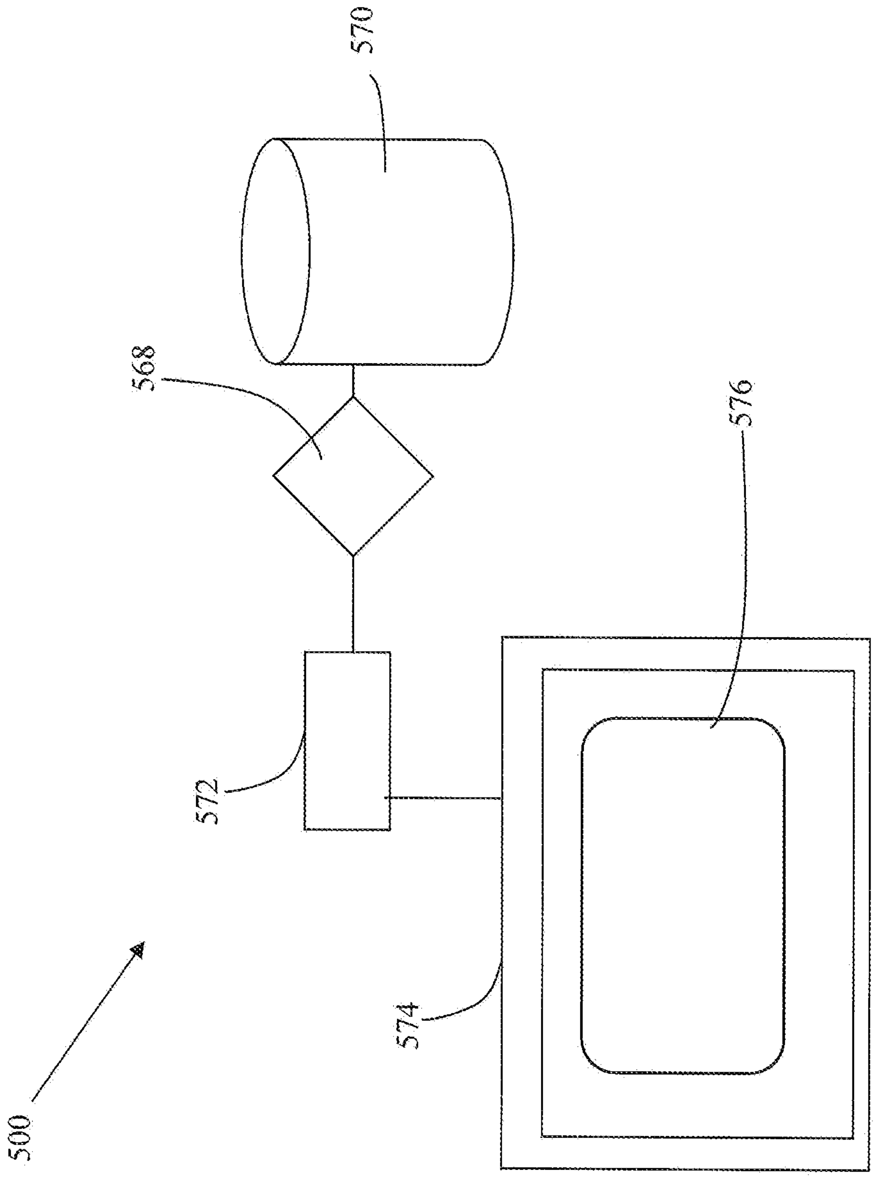
FIG. 5 is a schematic diagram depicting the components of an exemplary system configured and constructed according to some embodiments of the invention.

FIG. 5 illustrates a diagram of an exemplary system 500, which may be a portable device, constructed in accordance with some embodiments of the invention. System 500 includes processing device 568 in communication with a database or memory device 570, communication or data input/output device 572, and a display device 574. In some embodiments, display device 574 is a touch-enabled device and includes a data input device component. Memory device 570 may include data relating to the underlying game and embodiments of the invention as described herein, such as the side wager criteria. A player interface 576 can be presented on display device 574. Player interface 576 may be a virtual representation of a game table layout such as surface 250 and/or one or more player positions 254 (see FIG. 2) for facilitating the transmittal and receipt of wagers in accordance with any of the embodiments herein, such as method 100. Game outcomes are displayed and wagers are tracked using display device 574 and processing device 568 to compare the final player and dealer hands as well as any side wager winning criteria and to determine an outcome and payout to be displayed on display device 574 accordingly.

Figure 6:
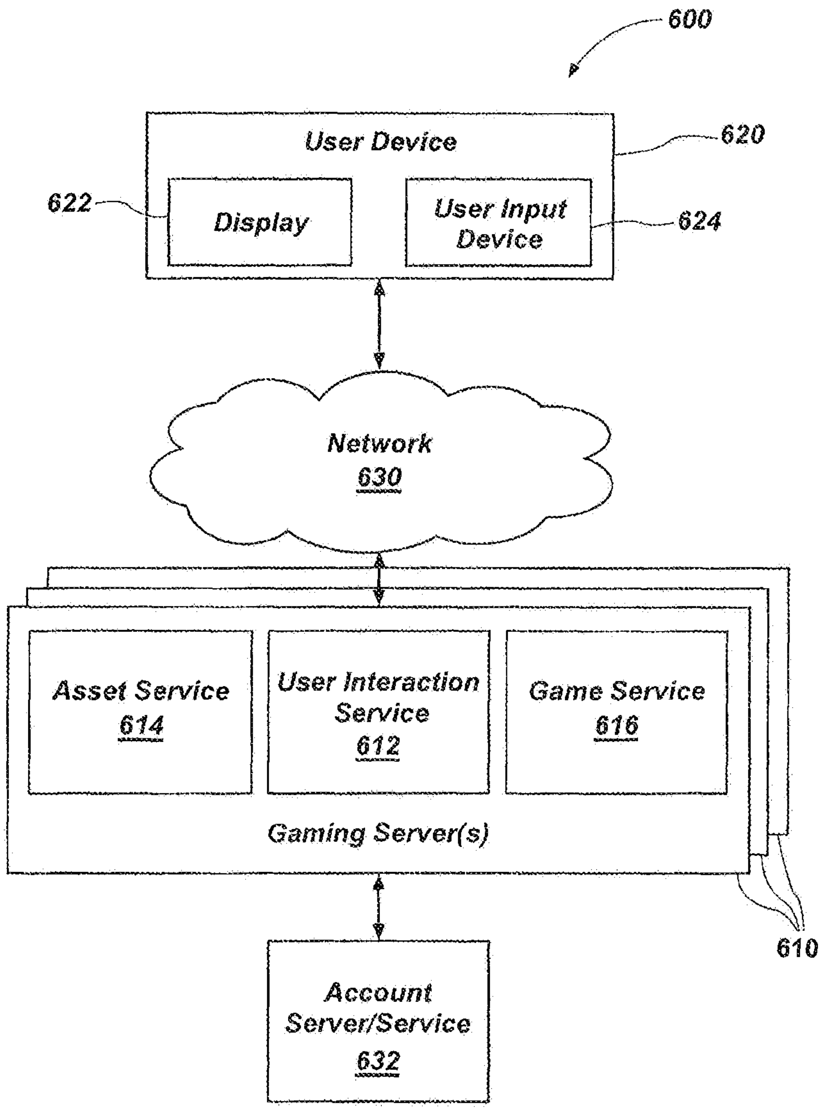
FIG. 6 is a schematic block diagram of a gaming system for implementing embodiments of waging games in accordance with this disclosure.

In some embodiments, wagering games in accordance with this disclosure may be administered using a gaming system employing a client-server architecture (e.g., over the Internet, a local area network, etc.). FIG. 6 is a schematic block diagram of an exemplary gaming system 600 for implementing wagering games so that end users may remotely access games as described herein, among others.

The wagering games of the invention supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform to establish a portal for an end user to access a wagering game hosted by one or more gaming servers 610 over a network 630. In embodiments, games are accessed through a user interaction service 612. The gaming system 600 enables players to interact with a user device 620 through a user input device 624 and a display 622 and to communicate with one or more gaming servers 610 using a network 630 (e.g., the Internet). Typically the user device is remote from the gaming server 610 and the network is the world-wide web (i.e., internet).

In some embodiments, the gaming servers 610 may be configured as a single server to administer wagering games in combination with the user device 620. In other embodiments, the gaming servers 610 may be configured as separate servers for performing separate, dedicated functions associated with administering wagering games. Accordingly, the following description also discusses "services" with the understanding that the various services may be performed by different servers or combinations of servers in different embodiments. As shown in FIG. 6, the gaming servers 610 may include a user interaction service 612, a game service 616, and an asset service 614. In some embodiments, one or more of the gaming servers 610 may communicate with an account server 632 performing an account service 632. As explained more fully below, for some wagering type games, the account service 632 may be separate and operated by a different entity than the gaming servers 610; however, in some embodiments the account service 632 may also be operated one or more of the gaming servers 610.

The user device 620 may communicate with the user interaction service 612 through the network 630. The user interaction service 612 may communicate with the game service 616 and provide game information to the user device 620. In some embodiments, the game service 616 may also include a game engine. The game engine may comprise game rules. In some embodiments, a single user device 620 communicates with a game provided by the game service 616, while other embodiments may include a plurality of user devices 620 configured to communicate and provide end users with access to the same game provided by the game service 616. In addition, a plurality of end users may be permitted to access a single user interaction service 612, or a plurality of user interaction services 612, to access the game service 616. The user interaction service 612 may enable a user to create and access a user account and interact with game service 616. The user interaction service 612 may enable users to initiate new games, join existing games, and interface with games being played by the user.

The user interaction service 612 may also provide a client for execution on the user device 620 for accessing the gaming servers 610. The client provided by the gaming servers 610 for execution on the user device 620 may be any of a variety of implementations depending on the user device 620 and method of communication with the gaming servers 610. In one embodiment, the user device 620 may connect to the gaming servers 610 using a web browser, and the client may execute within a browser window or frame of the web browser. In another embodiment, the client may be a stand-alone executable on the user device 620.

For example, the client may comprise a relatively small amount of script, also referred to as a "script driver," including scripting language that controls an interface of the client. The script driver may include simple function calls requesting information from the gaming servers 610. In other words, the script driver stored in the client may merely include calls to functions that are externally defined and executed by the gaming servers 610. As a result, the client may be characterized as a "thin client." The client may simply send requests to the gaming servers 610 rather than performing logic itself. The client may receive player inputs, and the player inputs may be passed to the gaming servers 610 for processing and executing the wagering game. In some embodiments, this may involve providing specific graphical display information for the display 622 as well as game outcomes.

As another example, the client may comprise an executable file rather than a script. The client may do more local processing than does a script driver, such as calculating where to show what game symbols upon receiving a game outcome from the game service 616 through user interaction service 612. In some embodiments, portions of an asset service 614 may be loaded onto the client and may be used by the client in processing and updating graphical displays. Some form of data protection, such as end-to-end encryption, may be used when data is transported over the network 630. The network 630 may be any network, such as, for example, the Internet or a local area network.

The gaming servers 610 may include an asset service 614, which may host various media assets (e.g., text, audio, video, and image files) to send to the user device 620 for presenting the various wagering games to the end user. In other words, the assets presented to the end user may be stored separately from the user device 620. For example, the user device 620 requests the assets appropriate for the game played by the user; as another example, especially relating to thin clients, just those assets that are needed for a particular display event will be sent by the gaming servers 610, including as few as one asset. The user device 620 may call a function defined at the user interaction service 612 or asset service 614, which may determine which assets are to be delivered to the user device 620 as well as how the assets are to be presented by the user device 620 to the end user. Different assets may correspond to the various user devices 620 and their clients that may have access to the game service 616 and to different variations of wagering games.

The gaming servers 610 may include the game service 616, which may be programmed to administer wagering games and determine game play outcomes to provide to the user interaction service 612 for transmission to the user device 620. For example, the game service 616 may include game rules for one or more wagering games, such that the game service 616 controls some or all of the game flow for a selected wagering game as well as the determined game outcomes. The game service 616 may include pay tables and other game logic. The game service 616 may perform random number generation for determining random game elements of the wagering game. In one embodiment, the game service 616 may be separated from the user interaction service 612 by a firewall or other method of preventing unauthorized access to the game service 612 by the general members of the network 630.

The user device 620 may present a gaming interface to the player and communicate the user interaction from the user input device 624 to the gaming servers 610. The user device 620 may be any electronic system capable of displaying gaming information, receiving user input, and communicating the user input to the gaming servers 610. For example, the user device 620 may be a desktop computer, a laptop, a tablet computer, a set-top box, a mobile device (e.g., a smartphone), a kiosk, a terminal, or another computing device. As a specific, non-limiting example, the user device 620 operating the client may be an interactive electronic gaming system 300 (see FIG. 3) or portable system 500 (see FIG. 5), as described above. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer; or the client may be any other computer program configurable to access the gaming servers 610. The client may be illustrated within a casino webpage (or other interface) indicating that the client is embedded into a webpage, which is supported by a web browser executing on the user device 620.

In some embodiments, components of the gaming system 600 may be operated by different entities. For example, the user device 620 may be operated by a third party, such as a casino or an individual, that links to the gaming servers 610 which may be operated, for example, by a wagering game service provider. Therefore, in some embodiments, the user device 620 and client may be operated by a different administrator than the operator of the game service 616. In other words, the user device 620 may be part of a third-party system that does not administer or otherwise control the gaming servers 610 or game service 616. In other embodiments, the user interaction service 612 and asset service 614 may be operated by a third-party system. For example, a gaming entity (e.g., a casino) may operate the user interaction service 612, user device 620, or combination thereof to provide its customers access to game content managed by a different entity that may control the game service 616, amongst other functionality. In still other embodiments, all functions may be operated by the same administrator. For example, a gaming entity may elect to perform each of these functions in-house, such as providing access to the user device 620, delivering the actual game content, and administering the gaming system 600.

The gaming servers 610 may communicate with one or more external account servers 632 (also referred to herein as an account service 632), optionally through another firewall. For example, the gaming servers 610 may not directly accept wagers or issue payouts. That is, the gaming servers 610 may facilitate online casino gaming but may not be part of a self-contained online casino itself. Another entity (e.g., a casino or any account holder or financial system of record) may operate and maintain its external account service 632 to accept bets and make payout distributions. The gaming servers 610 may communicate with the account service 632 to verify the existence of funds for wagering and to instruct the account service 632 to execute debits and credits. As another example, the gaming servers 610 may directly accept bets and make payout distributions, such as in the case where an administrator of the gaming servers 610 operates as a casino.

Additional features may be supported by the gaming servers 610, such as hacking and cheating detection, data storage and archival, metrics generation, messages generation, output formatting for different end user devices, as well as other features and operations.

Figure 7:
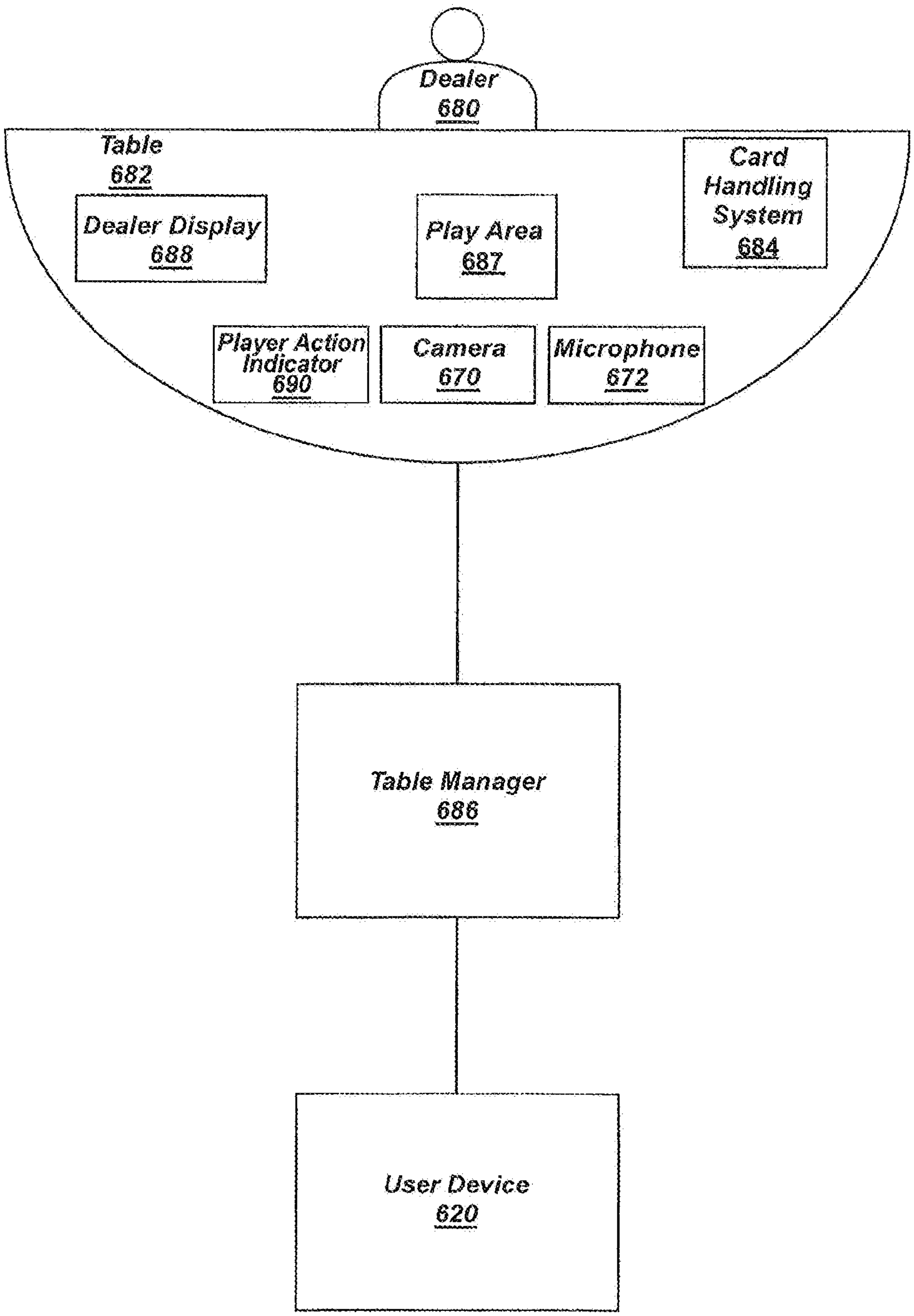
FIG. 7 is a schematic block diagram of a gaming system for implementing embodiments of wagering games including a live dealer feed.

FIG. 7 is a schematic block diagram of a table 682 for implementing wagering games including a live dealer feed. Features of the gaming system 600 described above in connection with FIG. 6 may be utilized in connection with this embodiment, except as further described. Rather than cards being determined by a computerized random processes, physical cards (e.g., from a standard, 52-card deck of playing cards) may be dealt by a live dealer 680 at a table 682 from a card handling system 684. A table manager 686 may assist the dealer 680 in facilitating play of the game by transmitting a video feed of the dealer's actions to the user device 620 and transmitting player elections to the dealer 680. As described above, the table manager 686 may act as or communicate with a gaming system 600 itself or as an intermediate client interposed between and operationally connected to the user device 620 and the gaming system 600 to provide gaming at the table 682 to users of the gaming system 600. Thus, the table manager 686 may communicate with the user device 620 through network 630, may be a part of a larger online casino, or may be operated as a separate system facilitating game play. In various embodiments, each table 682 may be managed by an individual table manager 686 constituting a gaming device, which may receive and process information relating to that table. For simplicity of description, these functions are described as being performed by the table manager 686, though certain functions may be performed by an intermediary gaming system 600, such as the one shown and described in connection with FIG. 6. In some embodiments, the gaming system 600 may match remotely located players to tables 682 and facilitate transfer of information between user devices 620 and tables 682, such as wagering amounts and player option elections, without managing gameplay at individual tables. In other embodiments, functions of the table manager 686 may be incorporated into a gaming system 600.

The table 682 includes a camera 670 and optionally a microphone 672 to capture video and audio feeds relating to the table 682. The camera 670 may be trained on the dealer 680, play area 687, and card handling system 684. As the game is administered by the dealer 680, the video feed captured by the camera 670 may be shown to the player using the user device 620, and any audio captured by the microphone 672 may be played to the player using the user device 620. In some embodiments, the user device 620 may also include a camera, microphone, or both, which may also capture feeds to be shared with the dealer 680 and other players. In some embodiments, the camera 670 may be trained to capture images of the card faces, chips, and chip stacks on the surface of the gaming table and perform card recognition routines to identify the card, rank, and suit, which is well known in the art.

Card and wager data in some embodiments may be used by the table manger 686 to determine game outcome. The data extracted from the camera 670 may be used to confirm the card data obtained from the card handling system 684, to determine a player position that received a card, and for general security monitoring purposes.

The live video feed permits the dealer to show cards dealt by the card handling system and play the game as though the player were at a live casino. In addition, the dealer can prompt a user by announcing a player's election is to be performed. In embodiments in which a microphone 672 is included, the dealer 680 can verbally announce action or request an election by a player. In some embodiments, the user device 620 also includes a camera or microphone, which also captures feeds to be shared with the dealer 680 and other players.

The play area 687 may depict a player positions for playing the game, such as surface 250 shown in FIG. 2. As determined by the rules of the game, the player at the user device 620 may be presented options for responding to an event in the game using a client as described with reference to FIG. 6.

Player selections may be transmitted to the table manager 686, which may display player elections to the dealer 680 using a dealer display 688 and player action indicator 690 on the table 682. For example, the dealer display 688 may display information regarding where to deal the next card or which player position is responsible for the next action.

In some embodiments, the table manager 686 may receive card information from the card handling system 684 to identify cards dealt by the card handling system 684. For example, the card handling system 684 may include a card reader to determine card information from the cards. The card information may include the rank and suit of each dealt card, and/or hand information.

The table manager 686 may apply game rules to the card information, along with the accepted player decisions, to determine gameplay events and wager results. Alternatively, the wager results may be determined by the dealer 680 and input to the table manager 686, which may be used to confirm automatically determined results by the gaming system.

Figure 8:
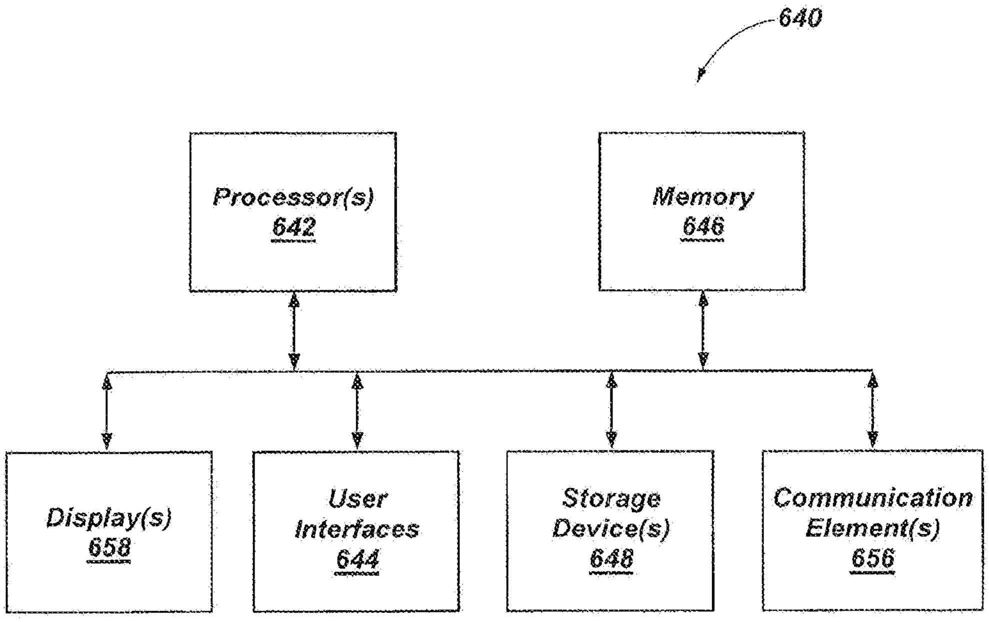
FIG. 8 is a block diagram of a computer for acting as a gaming system for implementing embodiments of wagering games in accordance with this disclosure.

FIG. 8 is a simplified block diagram showing elements of computing devices that may be used in systems and apparatuses of this disclosure. The computing system 640 may be a user-type computer, a file server, a computer server, a notebook computer, a tablet, a handheld device, a mobile device, or other similar computer system for executing software. The computing system 640 may be configured to execute software programs containing computing instructions and may include one or more processors 642, memory 646, one or more displays 658, one or more user interface elements 644, one or more communication elements 656, and one or more storage devices 648 (also referred to herein simply as storage 648).

The processors 642 may be configured to execute a wide variety of operating systems and applications including the computing instructions for administering wagering games of the present disclosure.

The memory 646 may be used to hold computing instructions, data, and other information for performing a wide variety of tasks including administering wagering games of the present disclosure. By way of example, and not limitation, the memory 646 may include Synchronous Random Access Memory (SRAM), Dynamic RAM (DRAM), Read-Only Memory (ROM), Flash memory, and the like.

The display 658 may be a wide variety of displays such as, for example, light emitting diode displays, liquid crystal displays, cathode ray tubes, and the like. In addition, the display 658 may be configured with a touch-screen feature for accepting user input as a user interface element 644.

As non-limiting examples, the user interface elements 644 may include elements such as displays, keyboards, push buttons, mice, joysticks, haptic devices, microphones, speakers, cameras, and touchscreens.

As non-limiting examples, the communication elements 656 may be configured for communicating with other devices or communication networks. As non-limiting examples, the communication elements 656 may include elements for communicating on wired and wireless communication media such as, for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802.11 type wireless networks, cellular telephone/data networks, and other suitable communication interfaces and protocols.

The storage 648 may be used for storing relatively large amounts of nonvolatile information for use in the computing system 640 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 640 may be configured in many different ways with different types of interconnecting buses between the various elements. Moreover, the various elements may be subdivided physically, functionally, or a combination thereof. As one non-limiting example, the memory 646 may be divided into cache memory, graphics memory, and main memory. Each of these memories may communicate directly or indirectly with the one or more processors 642 on separate buses, partially-combined buses, or a common bus.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions with each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

The invention claimed is:

1. A method of securely providing a modified live Blackjack wagering game using playing card information received from playing cards distributed in a round of play of the modified live Blackjack wagering game to display at least one wagering opportunity at a specialized gaming table system, the at least one wagering opportunity being available for the round of play of the modified live Blackjack game, the specialized gaming table system comprising a processor, a random number generator, a memory unit, a display device, a source of randomized unrevealed playing cards and a playing card reading device, the playing card reading device being configured to read a rank of each playing card of the playing cards distributed in the round of play of the modified live Blackjack wagering game from the source of randomized unrevealed playing cards without revealing the rank of each playing card, the method comprising the steps of:

- receiving a wager at the specialized gaming table system from one or more participating players, wherein the receiving of the wager initiates the round of play of the modified live Blackjack wagering game;
- responsive to receiving a secondary game wager at the specialized gaming table system, the processor actuating the random number generator, the random number generator being configured to randomly generate a secondary game outcome;
- displaying the secondary game outcome on the display device;
- determining by the playing card reading device the rank of each playing card of the playing cards distributed in the round of play;
- distributing the playing cards to form an initial player hand for each participating player of the one or more participating players and an initial dealer hand;
- displaying the rank of a revealed playing card of the playing cards forming the initial dealer hand;
- continuing the round of play of the modified live Blackjack wagering game to form a final dealer hand of at least two playing cards, the at least two playing cards including the revealed playing card of the playing cards forming the initial dealer hand; and
- responsive to the final dealer hand matching the secondary game outcome, distributing a secondary game payout.

2. The method according to claim 1, wherein the secondary game outcome comprises one or more playing cards displayed on the display device.

3. The method according to claim 2, wherein the second game payout is distributed responsive to the final dealer hand matching the one or more playing cards displayed on the display device.

4. The method according to claim 1, wherein the secondary game outcome comprises one or more Blackjack hand scores displayed on the display device.

5. The method according to claim 4, wherein the second game payout is distributed responsive to the final dealer hand having a final dealer hand score matching the one or more Blackjack hand scores.

6. The method according to claim 5, wherein the secondary game payout is increased responsive to the number of playing cards forming the final dealer hand.

7. The method according to claim 5, wherein the secondary game payout comprises a portion of a progressive jackpot.

8. The method according to claim 1, further comprising the steps of:

- displaying on the display device an additional wagering opportunity available to be wagered on by the one or more participating players solely for the round of play of the modified live Blackjack wagering game, the payout amounts for the additional wagering opportunity being determined by the processor based on at least the rank of the revealed playing card of the playing cards forming the initial dealer hand;
- receiving a side wager associated with the additional wagering opportunity;
- responsive to determining a final dealer hand score for the final dealer hand, determining an outcome of the additional wagering opportunity based at least in part on the final dealer hand score; and distributing a payout amount responsive to the outcome, wherein the payout amount is based at least in part on the rank of the revealed playing card of the playing cards forming the initial dealer hand.

9. The method according to claim 8, wherein the payout amount is based at least in part on the rank of the revealed playing card of the playing cards forming the initial dealer hand and at least in part on the at least two playing cards forming the final dealer hand.

10. The method according to claim 1, further comprising the steps of:

determining an initial player hand score for the initial player hand of each participating player of the one or more participating players based at least on the determination of the rank of the playing cards forming the initial player hand; and responsive to the processer determining that the initial player hand score for a participating player is within a range of preset hand scores, receiving from the participating player one of i) a selection to immediately resolve the round of play, wherein the round of play is terminated responsive to receiving the selection to immediately resolve the round of play and a payout is distributed to the participating player without a final game resolution of the round of play, the payout being determined based on the initial player hand score, or ii) a selection to continue the round of play until the final game resolution is determined, wherein the final game resolution of the round of play is determined based on a comparison of the final player hand score and the final dealer hand score.

11. A specialized gaming table system configured to securely conduct a round of play of a modified live Blackjack game in which at least one wagering opportunity is determined responsive to playing card information received during the round of play, the at least one wagering opportunity being available for the round of play of the modified live Blackjack game, the system comprising:

a gaming table defining a plurality of player positions;

a display, the display being mounted adjacent to the gaming table;

a playing card reading device, the playing card reading device being installed at the gaming table and operatively associated with a source of randomized unrevealed playing cards;

a memory unit;

a processor, the processor being configured to determine a payout amount for the at least one wagering opportunity being determined responsive to the playing card information received during the round of play of the modified live Blackjack game;

a random number generator;

wherein the memory unit including executable code stored therein, and in communication with the display, the playing card reading device and the processor, the processor executing the executable code whereby the specialized gaming table system is configured to:

responsive to detecting receipt of a wager from one or more participating players, actuating the round of play of the modified live Blackjack game;

responsive to detecting receipt of a secondary game wager from one or more participating players, actuating the random number generator to randomly generate a secondary game outcome;

display the secondary game outcome on the display;

determine by the processor being in communication with the playing card reading device, a rank of each playing card of a plurality of playing cards prior to distributing the plurality of playing cards to form an initial player hand for each participating player of the one or more participating players and an initial dealer hand, wherein the initial dealer hand includes a playing card in a condition revealing the rank of the playing card;

determine by the processor a final dealer hand of at least two playing cards, the at least two playing cards including the revealed playing card of the playing cards forming the initial dealer hand; and responsive to at least one of a final player hand or the final dealer hand matching the secondary game outcome, determine a secondary game payout.

12. The system of claim 11, wherein the specialized gaming table is configured to:

determine by the processor an additional wagering opportunity and a payout amount for the additional wagering opportunity, the additional wagering opportunity relating to an identification of a final dealer hand score, the additional wagering opportunity being available only for the round of play of the modified live Blackjack game, wherein the payout amount for the additional wagering opportunity is based at least in part on the rank of the playing card in the initial dealer hand in the condition revealing the rank of the playing card;

display the additional wagering opportunity and the payout amount for the additional wagering opportunity on the display; and detect receipt of a side wager on the additional wagering opportunity, wherein the payout amount for the additional wagering opportunity is distributed responsive to determining the final dealer hand score of the final dealer hand matches the identification of the final dealer hand score.

13. The system of claim 12, wherein the payout amount is based at least in part on the rank of the playing card in the initial dealer hand in the condition of revealing the rank of the playing card and at least in part on the at least two playing cards of the final dealer hand.

14. The system of claim 11, wherein the secondary game outcome comprises one or more playing cards displayed on the display device.

15. The system of claim 11, wherein the second game payout is distributed responsive to the final dealer hand matching the one or more playing cards displayed on the display device.

16. The system of claim 11, wherein the secondary game outcome comprises one or more Blackjack hand scores displayed on the display device.

17. The system of claim 16, wherein the second game payout is distributed responsive to the final dealer hand having a final dealer hand score matching the one or more Blackjack hand scores.

18. The system of claim 17, wherein the secondary game payout is increased responsive to the number of playing cards forming the final dealer hand.

19. The method according to claim 17, wherein the secondary game payout comprises a portion of a progressive jackpot.

20. A method of securely providing a modified live Blackjack wagering game using playing card information received from playing cards distributed in a round of play of the modified live Blackjack wagering game to display a secondary wagering game at a specialized gaming table system, the secondary wagering game being available for the round of play of the modified live Blackjack game, the specialized gaming table system comprising a processor, a random number generator, a memory unit, a display device, a source of randomized unrevealed playing cards and a playing card reading device, the playing card reading device being configured to read a rank of each playing card of the playing cards distributed in the round of play of the modified live Blackjack wagering game from the source of randomized unrevealed playing cards without revealing the rank of each playing card, the method comprising the steps of:

receiving a wager at the specialized gaming table system from one or more participating players, wherein the receiving of the wager initiates the round of play of the modified live Blackjack wagering game;

responsive to receiving a secondary game wager at the specialized gaming table system, the processor actuating the random number generator configured to randomly generate a secondary game outcome;

displaying the secondary game outcome on the display device, wherein the secondary game outcome is a Blackjack game score;

determining by the playing card reading device the rank of each playing card of the playing cards distributed in the round of play;

distributing the playing cards to form an initial player hand for each participating player of the one or more participating players and an initial dealer hand;

displaying the rank of a revealed playing card of the playing cards forming the initial dealer hand;

continuing the round of play of the modified live Blackjack wagering game to form a final dealer hand of at least two playing cards, the at least two playing cards including the revealed playing card of the playing cards forming the initial dealer hand;

determining a final dealer hand score for the final dealer hand; and responsive to the final dealer hand score matching the secondary game outcome, distributing a secondary game payout.

* * * * *